(12) United States Patent
Schimke et al.

(10) Patent No.: US 12,288,113 B2
(45) Date of Patent: *Apr. 29, 2025

(54) SIGNATURE-BASED UNIQUE IDENTIFIER

(71) Applicant: HALLMARK CARDS, INCORPORATED, Kansas City, MO (US)

(72) Inventors: Scott A. Schimke, Leavenworth, KS (US); Jennifer R. Garbos, Kansas City, MO (US); David Niel Johnson, Gladstone, MO (US)

(73) Assignee: Hallmark Cards, Incorporated, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,388

(22) Filed: Jan. 5, 2024

(65) Prior Publication Data

US 2024/0143966 A1 May 2, 2024

Related U.S. Application Data

(63) Continuation of application No. 17/579,829, filed on Jan. 20, 2022, now Pat. No. 11,900,194, which is a
(Continued)

(51) Int. Cl.
*G06K 19/06* (2006.01)
*G06F 16/583* (2019.01)
(Continued)

(52) U.S. Cl.
CPC ..... *G06K 19/06103* (2013.01); *G06F 16/583* (2019.01); *G06T 1/0028* (2013.01); *G09F 1/04* (2013.01)

(58) Field of Classification Search
CPC ............ G06K 19/06103; G06F 16/583; G06T 1/0028; G09F 1/04
(Continued)

(56) References Cited

U.S. PATENT DOCUMENTS 7,627,143 B1 * 12/2009 Abebe ...................... G07C 9/37
340/5.83
8,700,905 B2 * 4/2014 Guenther ................ G06F 21/64
713/189
(Continued)

OTHER PUBLICATIONS

New Zealand "Patent examination report 2," Aug. 14, 2023.
Australian Examination report No. 1 for standard patent application, Apr. 19, 2024.

*Primary Examiner* — Ahshik Kim
(74) *Attorney, Agent, or Firm* — Practus, LLP; Jesse J. Camacho

(57) ABSTRACT

The technology described herein can generate a unique identifier for a visual media that comprises pre-printed visual indications on the visual media and a user's handwritten signature. The location of the signature on the visual media can be determined by including preprinted fiducial marks on the visual media. The fiducial markers act as landmarks that allow the size and location of the signature to be determined in absolute terms. The unique identifier is then stored in computer memory on a user-experience server. The user-experience server can associate the unique identifier with a digital asset, such as an image or video, designated by the user. When the unique identifier is provided to the user-experience server a second time, the digital asset can be retrieved and output to the computing device that provided the unique identifier.

20 Claims, 11 Drawing Sheets

Related U.S. Application Data continuation of application No. 16/874,414, filed on May 14, 2020, now Pat. No. 11,263,503.

(51) Int. Cl.
  *G06T 1/00*      (2006.01)
  *G09F 1/04*      (2006.01)
(58) Field of Classification Search
  USPC .......................................................... 235/494
  See application file for complete search history.

(56)           References Cited

U.S. PATENT DOCUMENTS

| | | | |
|---|---|---|---|
| 8,978,974 B2* | 3/2015 | Voigt | G06V 10/95 |
| | | | 235/380 |
| 11,263,503 B2* | 3/2022 | Schimke | G09F 1/04 |
| 11,469,904 B1* | 10/2022 | Kats | G06F 21/602 |
| 11,900,194 B2* | 2/2024 | Schimke | G06F 16/583 |
| 2005/0246337 A1 | 11/2005 | Forman | |
| 2007/0016790 A1 | 1/2007 | Brundage et al. | |
| 2007/0188793 A1* | 8/2007 | Wakai | H04N 1/00912 |
| | | | 358/1.14 |
| 2009/0158177 A1* | 6/2009 | Kodimer | G06F 40/186 |
| | | | 715/762 |
| 2010/0158326 A1 | 6/2010 | Takeda | |
| 2013/0132228 A1* | 5/2013 | Chang | G06Q 30/02 |
| | | | 705/26.5 |

\* cited by examiner

SIGNATURE-BASED UNIQUE IDENTIFIER

CROSS-REFERENCE TO RELATED APPLICATIONS

This application is a continuation of prior U.S. Patent Application Ser. No. 17/579,829 filed on Jan. 20, 2022 (entitled SIGNATURE-BASED UNIQUE IDENTIFIER, now U.S. Pat. No. 11,900,194), which is a continuation of U.S. patent application Ser. No. 16/874,414 filed May 14, 2020 (entitled SIGNATURE-BASED UNIQUE IDENTIFIER, now U.S. Pat. No. 11,263,503). Both of the aforementioned applications (and patents) are hereby incorporated by reference in their entirety.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Aspects of the technology described herein generate a unique identifier for a visual media that comprises pre-printed visual indications on the visual media and a user's handwritten marking, such as a signature. The visual media includes printed media, such as a greeting card, gift card, or ornament.

The unique identifier is unique because of visual characteristics created by a user's handwritten signature or other marking in combination with the location of the marking on the visual media. The location of the handwritten marking on the visual media can be determined by including pre-printed fiducial marks on the visual media. In general, it is beneficial for a fiducial marker to be a unique pattern that is easy for the computer software to recognize as a fiducial marker.

The fiducial markers act as landmarks that allow the size and location of the handwritten marking to be determined in absolute terms. The absolute size and location of the handwritten marking in combination with the handwritten marking itself can be used to create a unique identifier that in turn identifies the visual media to which the handwritten marking is affixed. In one aspect, a QR code or other machine-readable indicia may be provided on the visual media to identify a stock-keeping unit ("SKU") for the visual media, such as the greeting card. The machine-readable indicia may be used in combination with the handwritten marking and fiducial marks to create the unique identifier.

The unique identifier is then stored in computer memory on a user-experience server. The user-experience server can associate the unique identifier with a digital asset, such as an image or video, designated by the user. The visual media can then be communicated to a recipient. For example, a greeting card can be mailed from a sender to a recipient.

When the unique identifier is provided to the user-experience server a second time by a second computing device, the digital asset can be retrieved and output to the second computing device. For example, a recipient of a greeting card could scan the card to extract the unique identifier and then retrieve an associated digital asset, such as a personalized greeting video. Each time the unique identifier is provided, the digital asset can be output. In one aspect, storing the unique identifier includes storing an image of the handwritten marking along with size and location characteristics ascertained from an analysis of the handwritten marking in relation to the fiducial markers. Supplemental information may be stored with the unique identifier, such as a SKU for the visual media, sender information (e.g., a name or user ID), a time the unique identifier was created, and the like.

BRIEF DESCRIPTION OF THE DRAWINGS

The present disclosure is described in detail below with reference to the attached drawing figures, wherein.

DETAILED DESCRIPTION

Figure 1:
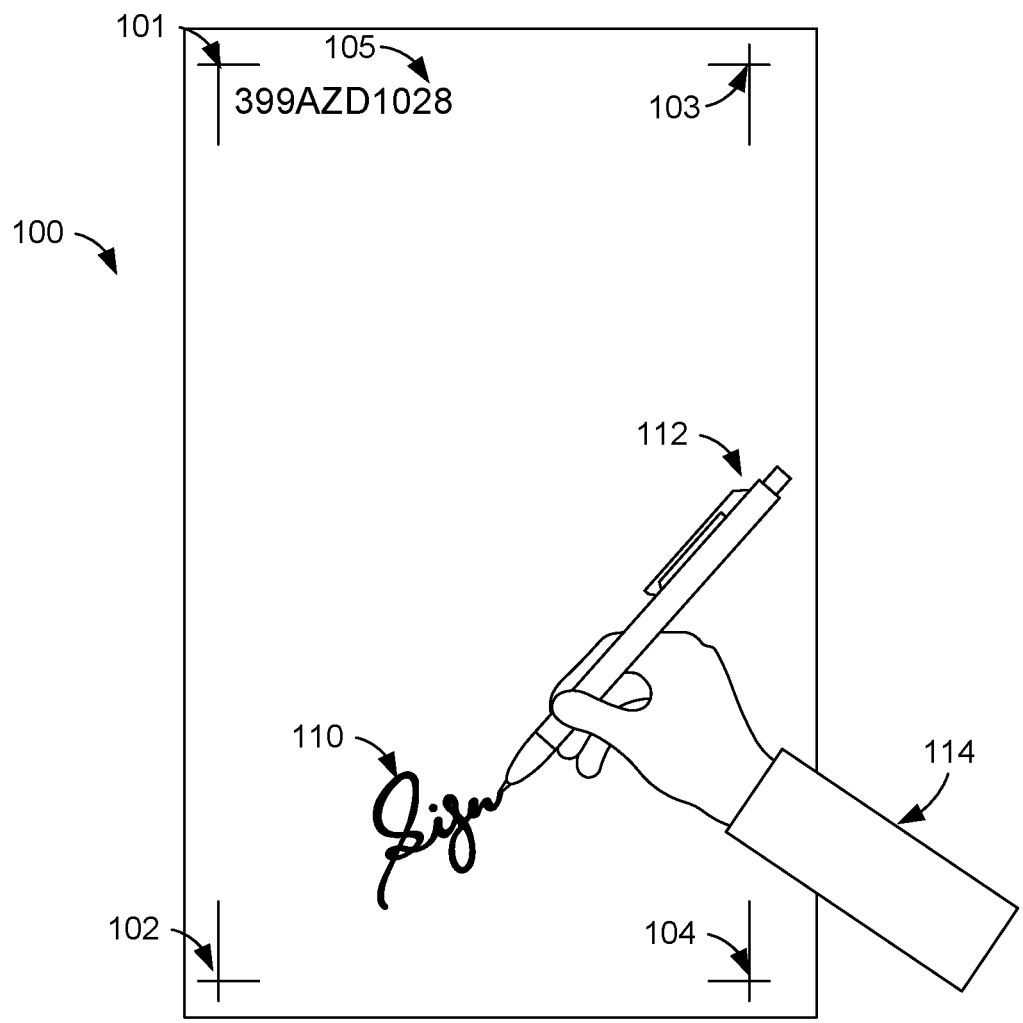
FIG. 1 is a diagram of a user signing a visual media, in accordance with aspects of the technology described herein.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Aspects of the technology described herein generate a unique identifier for a visual media that comprises pre-printed visual indications on the visual media and a user's handwritten marking, such as a signature, doodle, note, or drawing. The visual media includes printed media, such as a greeting card, gift card, post card, picture frame, Christmas ornament, or the like. The visual media can also include electronic media, such as an e-card, email, social media post, and the like.

The unique identifier is unique because of visual characteristics created by a user's handwritten marking in combination with the location of the marking on the visual media. In one aspect, the marking is a handwritten signature. In general, people have unique signatures when they are handwritten. For example, it would be rare for two people with the same name to have visually identical signatures. That is especially true because the signature is being analyzed by a computer imaging system, which can detect fine distinctions. As used herein, a signature is a visible production of all or part of a user's name by hand using a pen, pencil, stylus, finger, or other writing implement. The signature could be in cursive or printed letters. The signature can also comprise entirely a mark or marks the user commonly uses to identify himself or herself.

The location of the marking, such as a signature, on the visual media can be determined by including preprinted fiducial marks on the visual media. In general, it is beneficial for a fiducial marker to be a unique pattern that is easy for the computer software to recognize as a fiducial marker. It is also beneficial for the marker to be asymmetrical. It is easier to determine the relative positioning of the camera and the marker if some aspect of the marker is asymmetrical. An asymmetrical marker makes it possible for the vision software to determine which way the marker is oriented.

The fiducial markers act as landmarks that allow the size and location of the marking to be determined in absolute terms. The absolute size and location of the marking in combination with the handwritten marking itself can be used to create a unique identifier that in turn identifies the visual media to which the signature is affixed. In one aspect, a QR code or other machine-readable indicia may be provided on the visual media to identify a SKU for the visual media, such as the greeting card. This machine-readable indicia may be used in combination with the handwritten marking to create the unique identifier.

As used herein, the fiducial marks can be stand-alone marks, integrated marks, or derived from the actual design on the visual media (i.e., natural feature tracking). The stand-alone marks are visible apart from a design on the visual media. Stand-alone marks are illustrated with reference to FIG. 1. The examples herein are described in terms of stand-alone fiducial marks, but these examples are not intended to be limiting. Any type of fiducial mark or mark serving the purposes of the fiducial mark described herein, regardless of designation, may be used.

The fiducial marks can also be integrated. Integrated fiducial marks may also be described as aesthetic marks. Integrated fiducial marks are integrated into a design or possibly designed around. The typical user would not recognize the integrated fiducial marks as anything other than the design because they are often just shapes commonly seen in different designs. For example, the integrated fiducial marks can be a pair of circles, ovals, or other shapes. The design development may be performed with any color, texture, shape or other features as long as the circle (or other shape) pairs are integrated. The ratio of the radius of two circles in a pair can uniquely identify an integrated mark from a look up table. Other characteristics of the mark and associated visual media, if applicable, could be extracted from the look up table and used to perform operations described herein. For example, spatial information could be retrieved from the look up table and used to identify characteristics of a signature or other user mark on a visual media.

In one aspect, the fiducial marks use natural feature tracking. Natural feature tracking evaluates a design with machine vision technology and identifies key points within a design that can serve as fiducial marks. For example, the features could include corners, edges, blobs, without using specifically designed ID markers. These features allow the system to identify the specific design, along with the spatial features of the visual media on which the design is found. Understanding the spatial features of the design allow for the spatial features of a signature or other mark to be identified, as described subsequently.

The unique identifier is then stored in computer memory on a user-experience server. The user-experience server can associate the unique identifier with a digital asset designated by the user. When the unique identifier is provided to the user-experience server a second time, the digital asset can be output to the computing device that provided the unique identifier the second time. For example, a recipient of a greeting card could scan the card to extract the unique identifier and then retrieve an associated digital asset, such as a personalized greeting video. Each time the unique identifier is provided, the digital asset can be output. In one aspect, storing the unique identifier includes storing an image of the handwritten marking along with other size and location characteristics ascertained from an analysis of the handwritten marking in relation to the fiducial markers. Supplemental information may be stored with the unique identifier, such as a SKU for the visual media, sender information (e.g., a name or user ID), a time the unique identifier was created, and the like.

The technology allows a sender of the visual media to associate the unique identifier with a digital asset, such a picture, audio file, or video file. The sender can then communicate the visual media to a recipient. The recipient uses an application to retrieve the digital asset associated with the unique identifier. The digital asset can then be output for the recipient's enjoyment.

In the case of the printed media, a camera on a computing device, such as smart phone, can be used by the sender to capture and store the unique identifier. Similarly, the recipient can use a smart phone to capture an image of the unique identifier. The image may then be processed by an application on the smart phone and used to retrieve the digital asset associated with the unique identifier. Alternatively, the phone can send the image to a cloud-based service that analyzes the image and retrieves the digital asset, which is the communicated to the smart phone.

FIGS. 1-5 illustrate the use of the technology with a greeting card. However, aspects of the technology described herein are not limited to use with a greeting card. The example of FIGS. 1-5 describes the transfer of a greeting card between a first user and a second user. The first user is described as the sender and the second user is described as the recipient. In addition, FIGS. 1-5 describe the handwritten marking as a signature. Use of other handwritten markings is consistent with aspects of the technology described herein.

Turning now to FIG. 1, a sender 114 first applies his or her signature 110 on the physical greeting card 100, such as with a pen 112. The greeting card includes four fiducial markers. The first fiducial marker 101 is located in the upper left-hand corner of the greeting card 100. The second fiducial marker 102 is located in the lower left-hand corner of the greeting card 100. The third fiducial marker 103 is located in the upper right-hand corner of the greeting card 100. The fourth fiducial marker 104 is located in the lower right-hand corner of the greeting card 100. While the fiducial markers included here are stand-alone markers, integrated, or natural markers could also be used. The greeting card 100 also includes stock-keeping unit ("SKU") 105. The SKU identifies the greeting card model, but not the individual greeting card. In other words, all greeting cards of the same model may have the same SKU. The SKU may be used to identify a fiducial mark pattern associated with the card model. Different card models may include different fiducial marks, different arrangements of fiducial marks, and different amounts of fiducial marks, among other differences.

Figure 2:
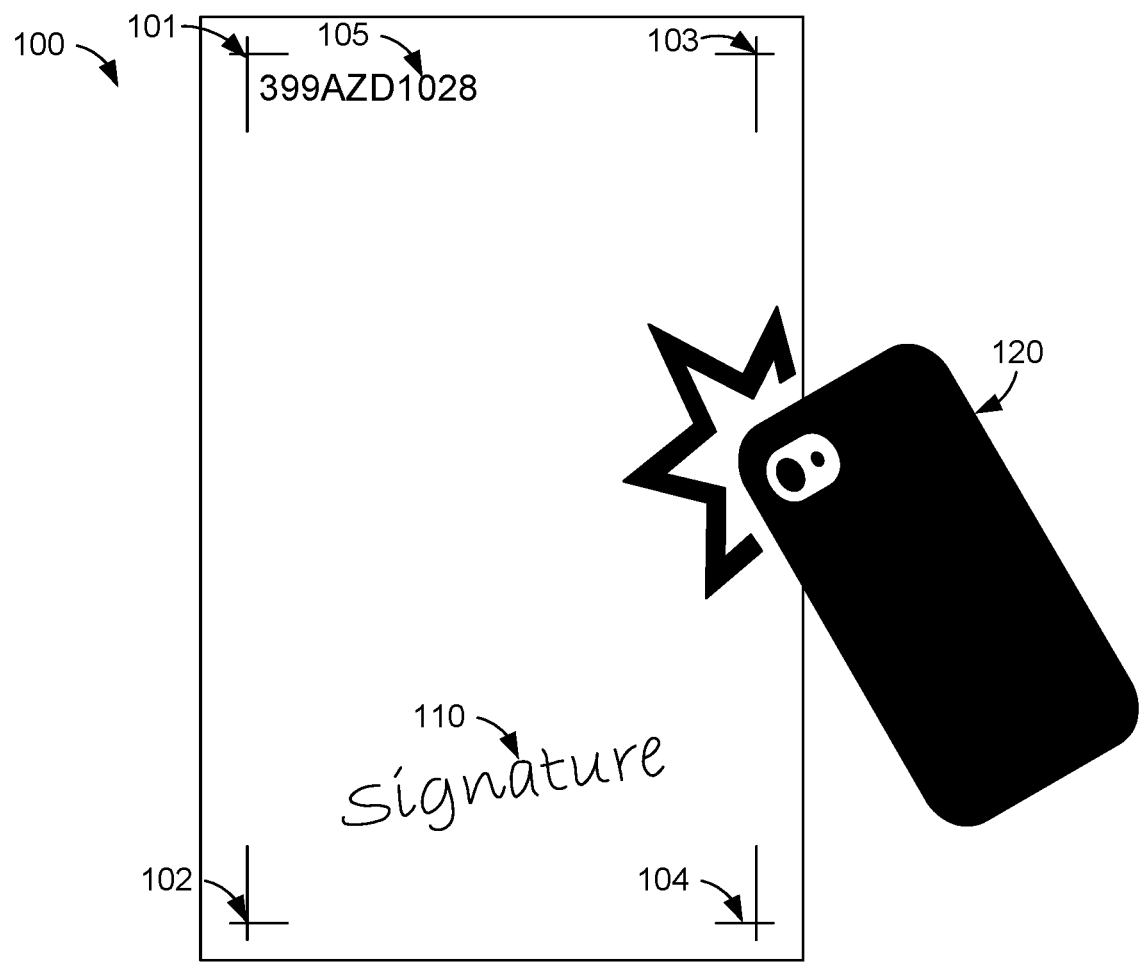
FIG. 2 is a diagram of a sender capturing an image of the sender's signature on the visual media, in accordance with aspects of the technology described herein.

Turning now to FIG. 2, the sender opens a media-identification interface of a greeting card application running on a mobile device 120 and takes a picture of the signature area with the mobile-device's camera. The media-identification interface may provide instructions that ask the user to capture the portion of the greeting card including the signature and the minimum required amount of fiducial marks. In other words, the portion of the visual media captured by the camera should include all fiducial marks required to generate a unique identifier that includes the signature 110. For example, it may be sufficient to include only the second fiducial marker 102 and the fourth fiducial marker 104 in the image in order to create a unique identifier. However, when the SKU is included on the visual media the instruction may request that the SKU also be included in the image. In this case, instructions could indicate that the signature should be captured along with at least two fiducial marks and the SKU. It should be pointed out that FIG. 2 only includes a single signature 110, however, aspects of the technology described herein can work with multiple signatures and use multiple signatures to generate the unique identifier.

The media-identification interface and/or greeting card application can perform a quality check on the image. If all required fiducial marks and the SKU watermark are not within the captured image, then the sender may be prompted to capture a second image. Alternatively or additionally, the quality check can be performed in real time through analysis of the video being received through the camera and instructions provided to adjust the camera location as needed. If all fiducial marks and SKU watermark are within the field of view, then the greeting card application instructs the user to capture an image, for example by tapping the screen. The greeting card application then generates a unique identifier using the signature, one or more fiducial marks, and optionally the SKU or information derived from the SKU. The forms the unique identifier can take will be described in more detail with reference to FIG. 7.

Figure 3:
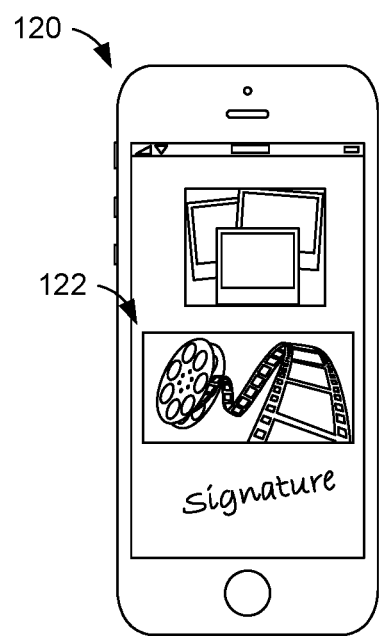
FIG. 3 is a diagram of a digital asset selection interface that a sender uses to associate a digital asset with the visual media, in accordance with aspects of the technology described herein.

Turning now to FIG. 3, the sender 114 selects one or more digital assets to associate with the greeting card 100. The digital assets may be identified through a media-identification interface provided by the greeting card application. The digital assets can include assets located on the mobile device, such as existing pictures and videos. The digital assets can include assets located on a server, such as publicly or privately available pictures and videos. The digital asset may also be created by the media-identification interface. For example, the media-identification interface can facilitate the user recording an audio or video message that becomes the digital asset. Back-end services, such as the user-experience server 702, associate digital assets with unique identifiers. The unique identifier is then stored in association with a reference to the digital asset. The unique identifiers may be used to retrieve the digital assets and output those assets to a recipient of the greeting card.

Figure 4:
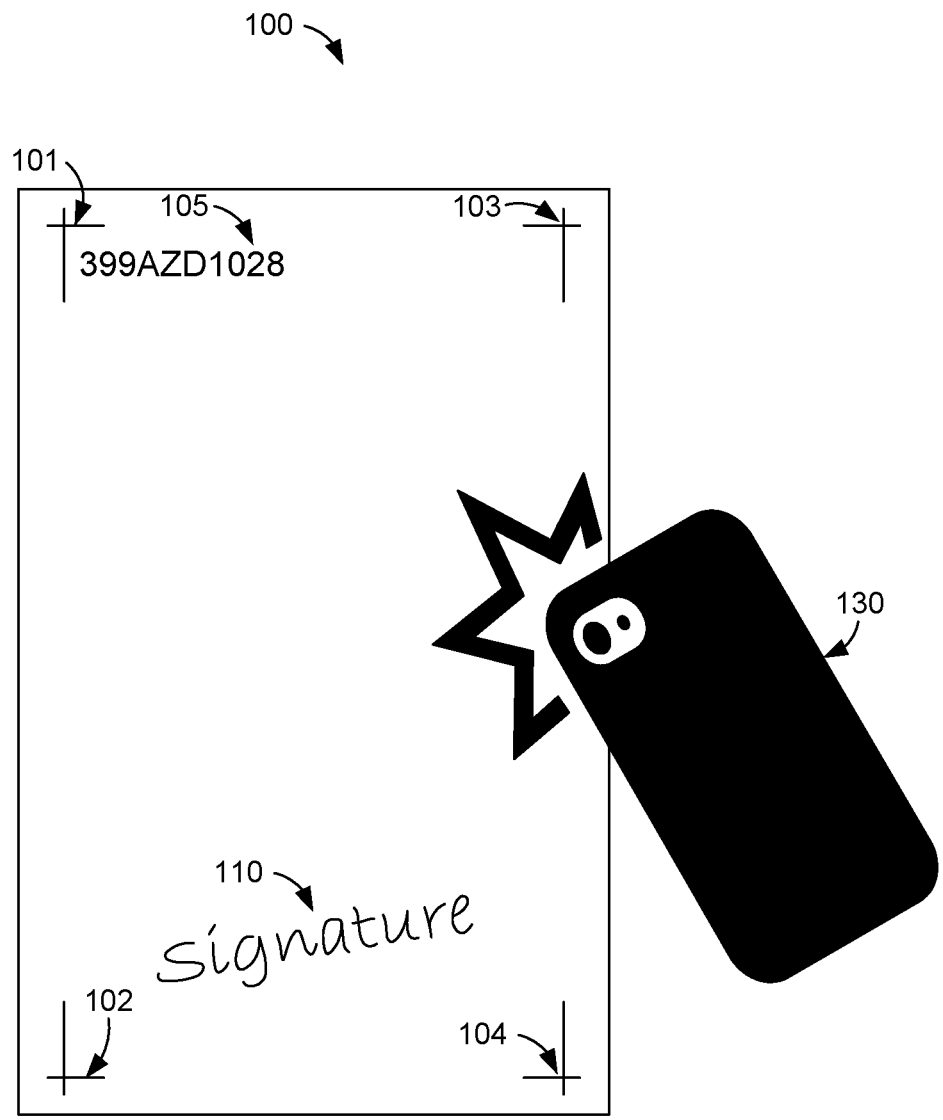
FIG. 4 is a diagram of a recipient capturing an image of a sender's signature on the visual media, in accordance with aspects of the technology described herein.

Turning now to FIG. 4, the recipient of the greeting card 100 opens the greeting card application in the recipient's mobile device 130 and scans the greeting card. As before, the greeting card application may provide instructions to the recipient to scan an adequate portion of the visual media. The adequate portion should include the signature 110 and the minimum required fiducial marks needed to reproduce the unique identifier. The adequate portion may include the SKU 105. If not all required fiducial marks are within the field of view, then the recipient may be prompted to adjust the camera location.

Figure 5:
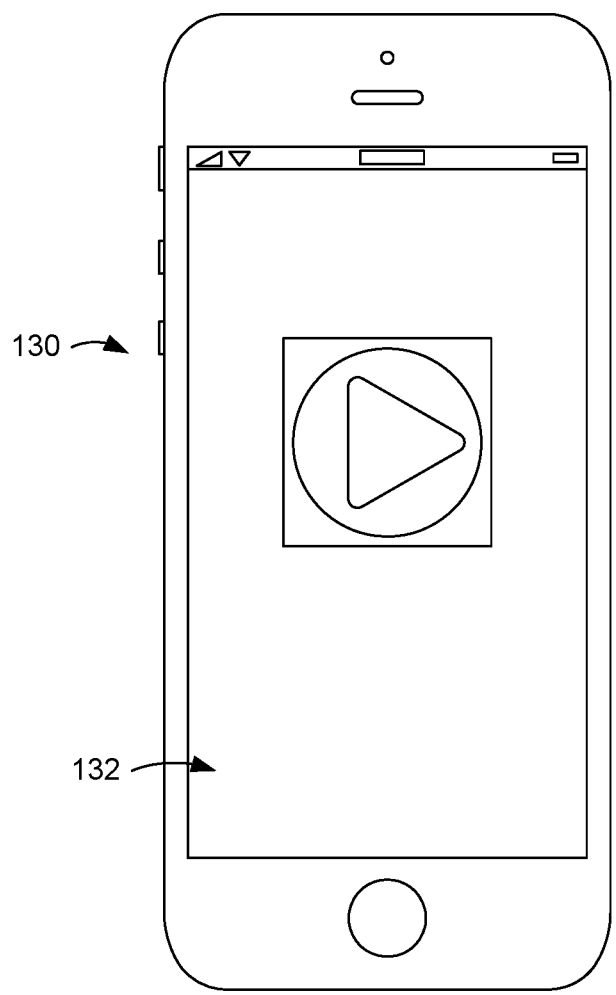
FIG. 5 is a diagram of a recipient viewing the digital asset through the recipient's user device, in accordance with aspects of the technology described herein.

Turning now to FIG. 5, the greeting card application then uses the image captured by the recipient to reproduce the unique identifier using the captured signature and fiduciary marks. The unique identifier is then sent to the user-experience server with instructions to retrieve any digital asset associated with unique identifier. The digital asset 132 is then provided to the recipient's mobile device 130 and output to the recipient.

Figure 6:
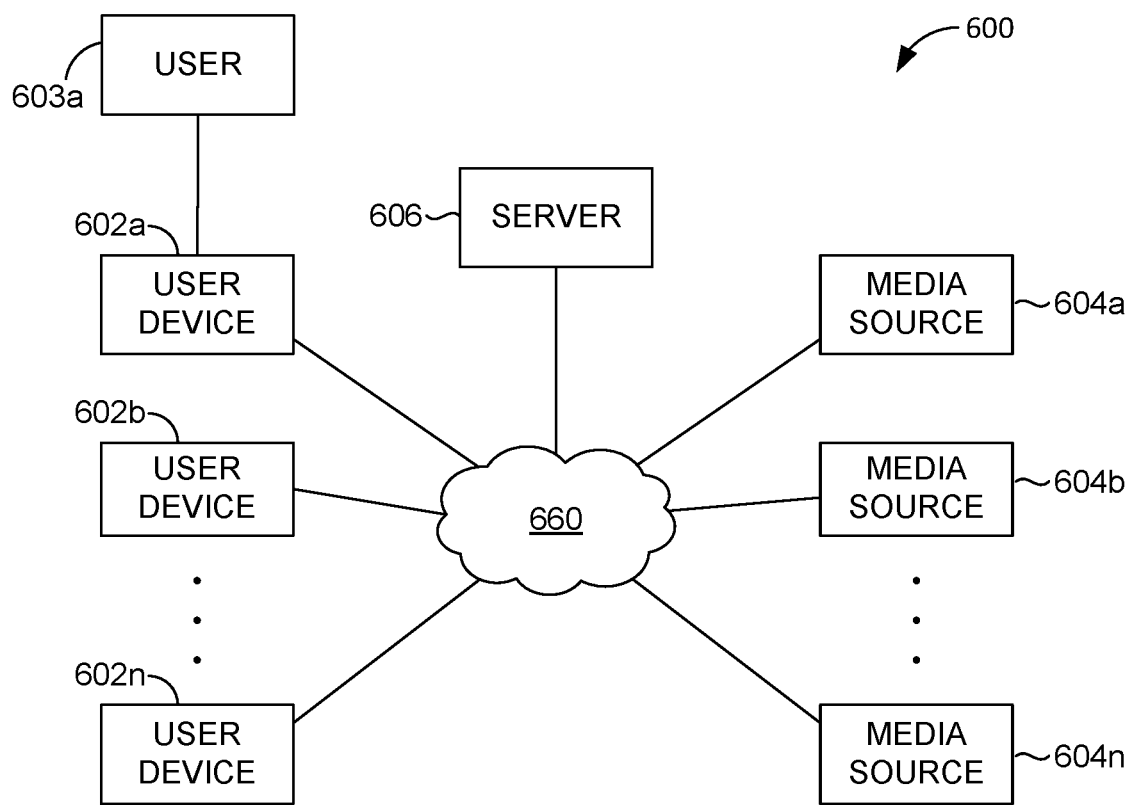
FIG. 6 is a block diagram of an exemplary computing environment suitable for use in implementing embodiments of the present disclosure.

Turning now to FIG. 6, a block diagram is provided showing an operating environment 600 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 600 includes a number of user devices, such as user devices 602a and 602b through 602n; a number of data sources, such as data sources 604a and 604b through 604n; server 606; user 603, and network 610. It should be understood that environment 600 shown in FIG. 6 is an example of one suitable operating environment. Each of the components shown in FIG. 6 may be implemented via any type of computing device, such as computing device 1100, described in connection to FIG. 11. These components may communicate with each other via network 610, which may include, without limitation, one or more local area networks (LANs) and/or wide area networks (WANs). In exemplary implementations, network 610 comprises the Internet and/or a cellular network, amongst any of a variety of possible public and/or private networks.

It should be understood that any number of user devices, servers, users, and data sources may be employed within operating environment 600 within the scope of the present disclosure. Each may comprise a single device or multiple devices cooperating in a distributed environment. For instance, server 606 may be provided via multiple devices arranged in a distributed environment that collectively provide the functionality described herein. Additionally, other components not shown may also be included within the distributed environment.

User devices 602a and 602b through 602n may comprise any type of computing device capable of use by a user 603. For example, in one embodiment, user devices 602a through 602n may be the type of computing device described in relation to FIG. 11 herein. By way of example and not limitation, a user device may be embodied as a personal computer (PC), a laptop computer, a mobile device, a smartphone, a tablet computer, a smart watch, a wearable computer, virtual reality headset, augmented reality headset, a personal digital assistant (PDA), an MP3 player, global positioning system (GPS) or device, video player, handheld communications device, gaming device or system, entertainment system, vehicle computer system, embedded system controller, a camera, remote control, a bar code scanner, a computerized measuring device, appliance, consumer electronic device, a workstation, or any combination of these delineated devices, or any other suitable device.

User devices 602a and 602b through 602n can be client devices on the client-side of operating environment 600, while server 606 can be on the server-side of operating environment 600. Server 606 can comprise server-side software designed to work in conjunction with client-side software on user devices 602a and 602b through 602n to implement any combination of the features and functionalities discussed in the present disclosure. This division of operating environment 600 is provided to illustrate one example of a suitable environment, and there is no requirement for each implementation that any combination of server 606 and user devices 602a and 602b through 602n remain as separate entities. Each user device 602a and 602b through 602n can be associated with one or more users, such as user 603. The users can include sender and recipients as described herein. Some user devices can be associated with multiple users, such as a family PC, game console, meeting room PC, electronic white board, and such. Similarly, a single user can be associated with multiple devices, including shared devices. A user sign in identification can be used to determine the user operating a user device at a point in time and to associate actions taken with a user record.

Data sources 604a and 604b through 604n may comprise data sources and/or data systems, which are configured to make data available to any of the various constituents of operating environment 600, or media-experience system 700 described in connection to FIG. 7. For instance, in one embodiment, one or more data sources 604a through 604n provide (or make available for accessing) digital assets that can be associated with unique identifiers. The digital assets can be uploaded from user devices 602a and 602b through 602n and/or from server 606.

Figure 7:
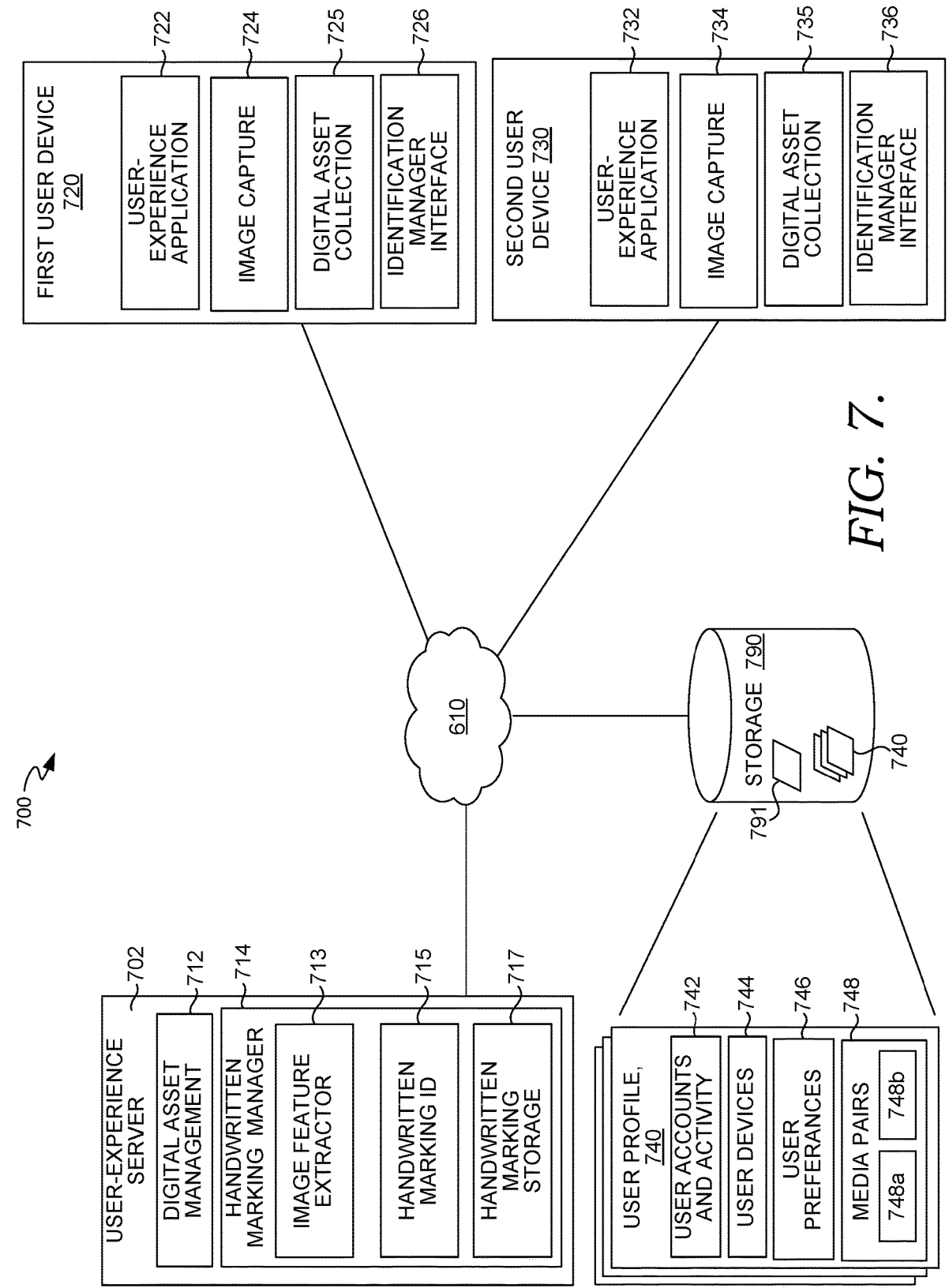
FIG. 7 is a block diagram illustrating an exemplary media-identification system in which some embodiments of the present disclosure may be employed.

Turning now to FIG. 7, a block diagram is provided illustrating an exemplary media-experience system 700 in which some embodiments of the present disclosure may be employed. The media-experience system 700 includes network 610, which is described in connection to FIG. 6, and which communicatively couples components of media-experience system 700. The components of media-experience system 700 may be embodied as a set of compiled computer instructions or functions, program modules, computer software services, or an arrangement of processes carried out on one or more computer systems, such as computing device 1100 described in connection to FIG. 11.

In one embodiment, the functions performed by components of media-experience system 700 are associated with one or more applications, services, or routines. In particular, such applications, services, or routines may operate on one or more user devices (such as user device 602a), servers (such as server 606), may be distributed across one or more user devices and servers, or be implemented in the cloud. Moreover, in some embodiments these components of media-experience system 700 may be distributed across a network, including one or more servers (such as server 606) and client devices (such as user device 602a), in the cloud, or may reside on a user device such as user device 602a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments of the disclosure described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regard to specific components shown in media-experience system 700, it is contemplated that in some embodiments functionality of these components can be shared or distributed across other components.

The media-experience system 700 generally operates to identify a unique identifier on a visual media, such as a greeting card, using a user's handwritten marking, such as a signature, in combination with fiducial marks pre-printed on the visual media. The unique identifier is used to associate a digital asset, such as a video, with the greeting card. The digital asset can be retrieved when the recipient of the card scans the handwritten marking and fiducial marks. As briefly mentioned above, each component of the media-experience system 700, including user-experience server 702, first user device 720, second user device 730, and storage 790 and their respective subcomponents, may reside on a computing device (or devices).

The user-experience server 702 is responsible for providing the server-side of the user experience. Using the greeting card as an example, the user-experience server 702 will receive a unique identifier and a designated digital asset from the sender's user device. For the purpose of illustration, the first user device 720 is described as the sender's user device and the second user device 730 is described as the recipient's user device. The user-experience server 702 will associate the unique identifier and the digital asset together within a data store. When the unique identifier is provided to the user-experience server 702 a second time, then the digital asset can be retrieved and communicated to the computing device that provided the unique identifier the second time. Optionally an address, such as a URL, where a digital asset can be found can be communicated instead of the digital asset itself.

The user-experience server 702 includes sub-components, such as digital asset management component 712, handwritten marking manager 714, image feature extractor 713, handwritten marking ID component 715, and handwritten marking storage 717. These components work together to provide the experience described above.

The digital asset management component 712 manages digital assets and the association of the digital asset with a unique identifier. Managing the digital asset can include storing the digital asset. For example, pictures, videos, and audio recording provided by the sender may be stored by the digital asset management component 712. The digital assets provided by a particular sender could be stored in storage 790 and associated with a user profile 740. In the example shown, the media pairs 748 include a digital asset 748a and the unique identifier 748b associated with it. A particular user, such as the sender, may be associated with multiple media pairs. In instances where the digital asset is already stored in association with a video provider, such as a social media platform, the digital asset 748a could be a link or reference to the digital asset. Any method of storing or identifying the digital asset in such a way that it may be retrieved in the future are suitable for use with the technology described herein.

Storing the media pairs in association with the user profile 740 can allow the user to modify the association. For example, a user that initially established the pairing may choose to delete the pairing, associate a different digital asset with the unique identifier, or otherwise update the pair.

The handwritten marking manager 714 receives images from a user device and generates a unique identifier that can be associated with the digital asset. In some aspects, the handwritten marking manager 714 and its subcomponents could be located on a user device. The handwritten marking manager 714 can receive images from both the sender's device and the recipient's device. Similar processes can be performed in either case. In the case of the sender, the image can be received as a unique identifier. In the case of the recipient, the image can be received a second time and the unique identifier generated and compared to existing identifiers in the system.

The image feature extractor 713 can extract features from a signature or other marking received. Features extracted from the image can be used to index the unique identifiers and can become part of the unique identifier. The image feature extractor 713 identifies the location of the handwritten marking on the visual media using the fiducial marks. The location can be identified as a center point of the handwritten marking. The location also could be identified as a distance from a fiducial mark. For example, a distance between the leftmost pixel including a portion of the signature and a fiducial mark could be one distance. A second distance could be the distance between the right most pixel and a fiducial mark. Multiple distances can be calculated in this manner between various aspects of the signature or other marking and various fiducial marks within the image. Collectively, the plurality of distances calculated could define the handwritten marking location.

In one aspect, four or more points on the handwritten marking are identified. For example, the rightmost, leftmost, topmost, and lowest pixels that include a portion of the handwritten marking may be identified. If the handwritten marking image was converted to black-and-white, with black pixels representing the ink, the above-referenced pixels could be identified by analyzing an area of the image associated with the handwritten marking and isolating black pixels. A distance calculation for each of these identified pixels to one or more fiducial markers can be made. Thus, if two fiducial markers are used along with the four pixels mentioned, then eight distance calculations could be made. These distance calculations could be combined in a hash function or some other manner to create a single number that represents the location of the handwritten marking. The single number could serve as part of the unique identifier. While it is possible that multiple handwritten markings could result in the same single number, the single number is only one part of the unique identifier. The other part comprises an image of the handwritten marking. Thus, the single number could be used to select a small subset of stored unique identifier for further analysis in response to receiving an image from a recipient.

Other features can also be identified. For example, the color of the ink used to make the handwritten marking can be a feature. The angle at which the handwritten marking, such as a signature, was made can be another feature. Similarly, the height and length of the handwritten marking are features. Not all signatures are easily converted to letters, but a feature can include one or more letters extracted from the signature along with a confidence that the letter was correctly identified. Extraction of other features is possible.

The handwritten marking identification component 715 generates the unique identifier. In its simplest form, the unique identifier is the image itself. In another aspect, the unique identifier is the image after undergoing some pre-processing, such as de-noising. In one instance, the image can be converted to a black-and-white image. The fiducial marks can be used to scale the handwritten marking to a common scale used to compare all handwritten marking. The unique identifier can also include location characteristics of the signature. As previously mentioned, the unique identifier could include a SKU.

The handwritten marking identification component 715 can also compare the handwritten marking image in a first unique ID stored on the system to the handwritten marking image provided by a recipient of a greeting card or other visual media. In one aspect, a pixel-by-pixel comparison is made of the original signature image to the second image. When the pixel-by-pixel comparison reveals a match, then the handwritten marking ID component 715 can provide a match message to a requesting component such as the digital asset management component 712.

The handwritten marking storage 717 stores the unique identifier including an image of the handwritten marking and associated fiducial marks. As mentioned, the handwritten marking storage 717 may use one or more aspects of the image to create a single identifier or number that can be used to retrieve the handwritten marking image for further analysis. For example, a hash of handwritten marking location data may be used by the handwritten marking storage 717 as an initial filter to find unique identifiers requiring further analysis to confirm a match. In one aspect, if the single number associated with a unique identifier is unique the no further analysis is required of the image to confirm a match.

The first user device 720 and the second user device 730 are provided. As mentioned, the first user device 720 can correspond to a user device used by a sender, while the second user device can be used by recipient. Both devices can include exactly the same components, but these components may perform different functions depending on whether the device is a sender or recipient.

The user-experience application 722 can perform functions on behalf of the sender and receiver. The functions performed by the user-experience application 722 working on behalf of the sender are explained in conjunction with the user-experience application 722. Functions performed by a recipient are explained subsequently in association with the description of the user-experience application 732. The user-experience application 722 could be a cloud-based experience provided through a web browser. The user-experience application 722 could be a specialized application that runs on the first user device 720 and communicates with a back end service.

The user-experience application 722 can generate the media-identification interface 726. The media-identification interface 726 can provide instructions asking the user to sign or otherwise add a handwritten marking to the visual media. Further instructions to capture an image of the marked visual media and associated fiducial marks can be provided. The instructions can use a combination of textual explanation and images.

The image capture component 724 captures an image of the handwritten marking, fiducial marks, and optionally an SKU. The image capture component 724 can then send the image to the user-experience application 722 for further use.

The digital asset collection 725 can provide an interface that allows the user to select a digital asset to associate with the visual media. The digital assets can include assets located on the mobile device, such as existing pictures and videos. The digital assets can include assets located on a server, such as publicly or privately available pictures and videos. The digital asset may also be created by the media-identification interface. For example, the media-identification interface 726 can facilitate the user recording an audio or video message that becomes the digital asset. The unique identifier and the digital asset and/or identification information for the digital asset are communicated to the user-experience server 702. The user-experience server 702 maintains an association between digital assets and unique identifiers. The unique identifiers may be used to retrieve the digital assets and output those assets to a recipient of the greeting card.

The second user device 730 is used by the recipient of the visual media. For example, a sender associated with the first user device 720 could mail a greeting card to the user of the second user device 730. The second user could then open the user-experience application 732 and follow instructions provided to retrieve a digital asset associated with the visual media by the first user. The user-experience application 732 could be a cloud-based experience provided through a web browser. The user-experience application 732 could be a specialized application that runs on the second user device 730 and communicates with a back end service. The user-experience application 732 can generate a media-identification interface 736 that instructs the user to take a picture of the handwritten marking and associated fiducial marks. The image capture component 734 can capture an image of the handwritten marking and fiducial marks and communicate the image to the user-experience application 732. The image can then be communicated to the user-experience server 702. The user-experience server 702 analyzes the image and identifies the digital asset associated with the unique identifier generated by analysis of the image. The digital asset collection 735 can perform functions that allow the digital asset to be output to the user through the second user device 730.

User profile 740 includes user accounts and activity data 742, user device information 744, user preferences 746, and media pairs 748. User account(s) and activity data 742 generally includes user data related to the sending and receiving of visual media using the user-experience server. In particular, user account(s) and activity data 742 can include data regarding user emails, texts, instant messages, calls, and other communications; social network accounts and data, such as news feeds; online activity; calendars, appointments, or other user data used by components of the system. Embodiments of user account(s) and activity data 742 may store information across one or more databases, knowledge graphs, or data structures. As discussed hereinabove, user device information 744 may include identification information for devices used by a single user. The user device information can be used for security reasons to validate a user, maintain a secure session, and for other purposes. User preferences 746 can include various permissions, such as how long digital assets and the association between the digital assets and the unique identifier should be maintained. The user preferences can include opt-in and opt-out selections for the sharing and collection of personal information.

Figure 8:
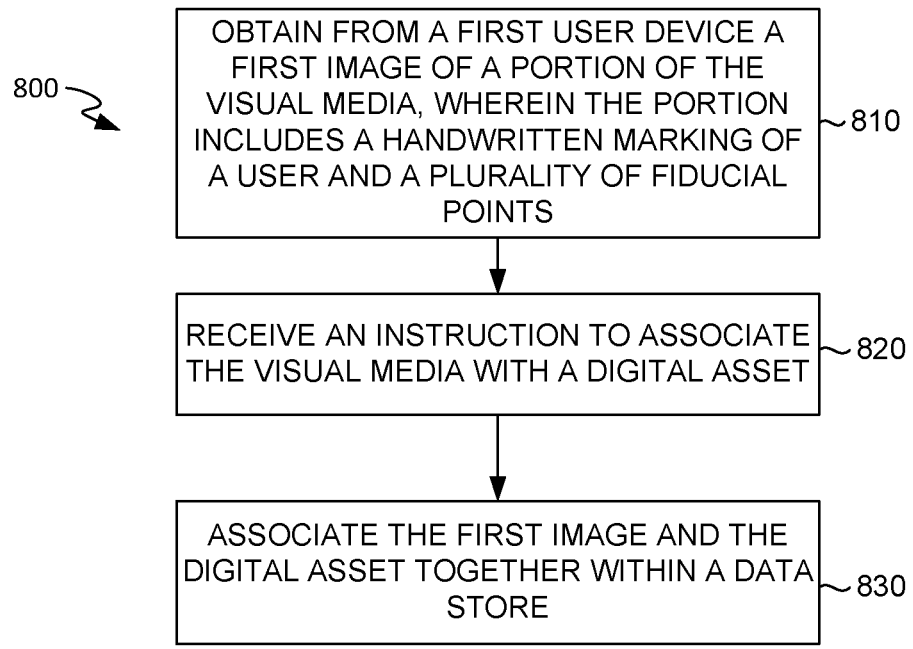
FIG. 8 is a flow diagram that illustrates method for uniquely identifying a visual media, in accordance with aspects of the technology described herein.

Turning now to FIG. 8, a method 800 a method for uniquely identifying a visual media is provided. Method 800 can be performed by a user device, such as user device 720.

At step 810, a first image of a portion of the visual media is obtained from a first user device. The portion includes a handwritten marking of a user and a plurality of fiducial marks. The handwritten marking could be a signature. A media-identification interface may provide instructions to the user to capture the portion of the greeting card including the handwritten marking and the minimum required amount of fiducial marks. In other words, the portion of the visual media captured by the camera should include all fiducial marks required to generate a unique identifier that includes the handwritten marking. For example, it may be sufficient to include only two fiducial marks in the image in order to create a unique identifier. However, when the SKU is included on the visual media the instruction may request that the SKU also be included in the image. In this case, instructions could indicate that the handwritten marking should be captured along with at least two fiducial marks and the SKU.

The media-identification interface and/or greeting card application can perform a quality check on the image. If all required fiducial marks and the SKU watermark are not within the captured image, then the sender may be prompted to capture a second image. Alternatively or additionally, the quality check can be performed in real time through analysis of the video being received through the camera and instructions provided to adjust the camera location as needed. If all fiducial marks and SKU watermark are within the field of view, then the greeting card application instructs the user to capture an image, for example by tapping the screen.

At step 820, an instruction to associate the visual media with a digital asset is received.

At step 830, the first image and the digital asset are associated together within a data store.

Figure 9:
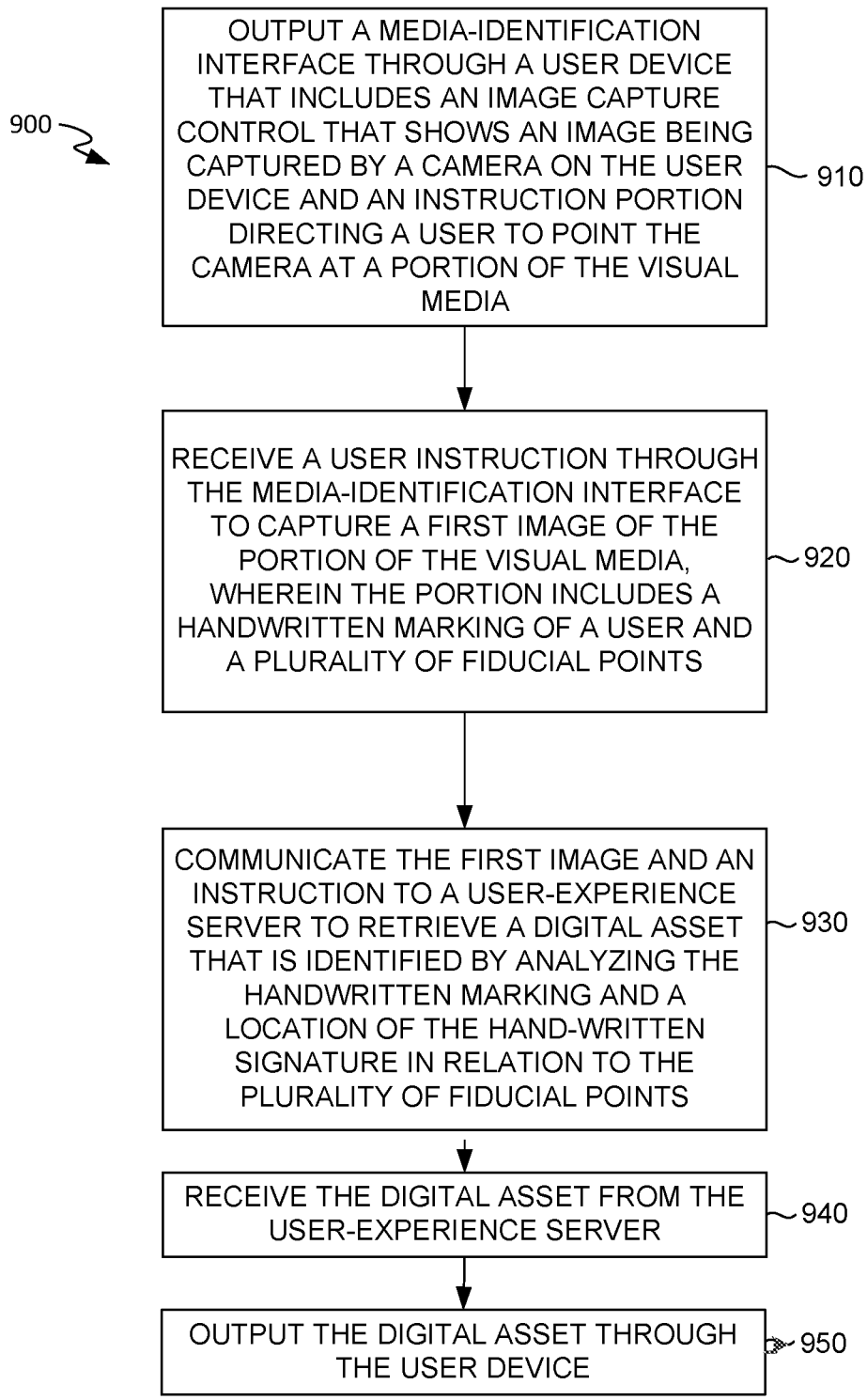
FIG. 9 is a flow diagram that illustrates method for uniquely identifying a visual media, in accordance with aspects of the technology described herein.

Turning now to FIG. 9, a method 900 a method for uniquely identifying a visual media is provided. Method 900 may be performed by second user device 730.

At step 910, a media-identification interface is output through a user device that includes an image capture control that shows an image being captured by a camera on the user device and an instruction portion directing a user to point the camera at a portion of the visual media. The instructions can include text and images. In other words, the portion of the visual media captured by the camera should include all fiducial marks required to generate a unique identifier that includes the handwritten marking, such as a signature. For example, it may be sufficient to include only two fiducial marks in the image in order to create a unique identifier. However, when the SKU is included on the visual media the instruction may request that the SKU also be included in the image. In this case, instructions could indicate that the handwritten marking should be captured along with at least two fiducial marks and the SKU.

At step 920, a user instruction is received through the media-identification interface to capture a first image of the portion of the visual media. The portion includes a handwritten marking of a user and a plurality of fiducial marks. The media-identification interface can perform a quality check on the image. If all required fiducial marks and the SKU watermark are not within the captured image, then the sender may be prompted to capture a second image. Alternatively or additionally, the quality check can be performed in real time through analysis of the video being received through the camera and instructions provided to adjust the camera location as needed. If all fiducial marks and SKU watermark are within the field of view, then the media-identification application instructs the user to capture an image, for example by tapping the screen.

At step 930, the first image and an instruction to retrieve a digital asset are communicated to a user-experience server. The digital asset is identified by analyzing the handwritten marking and a location of the handwritten marking in relation to the plurality of fiducial marks, as described previously with reference to FIG. 7.

At step 940, the digital asset is received from the user-experience server.

At step 950, the digital asset is output through the user device.

Figure 10:
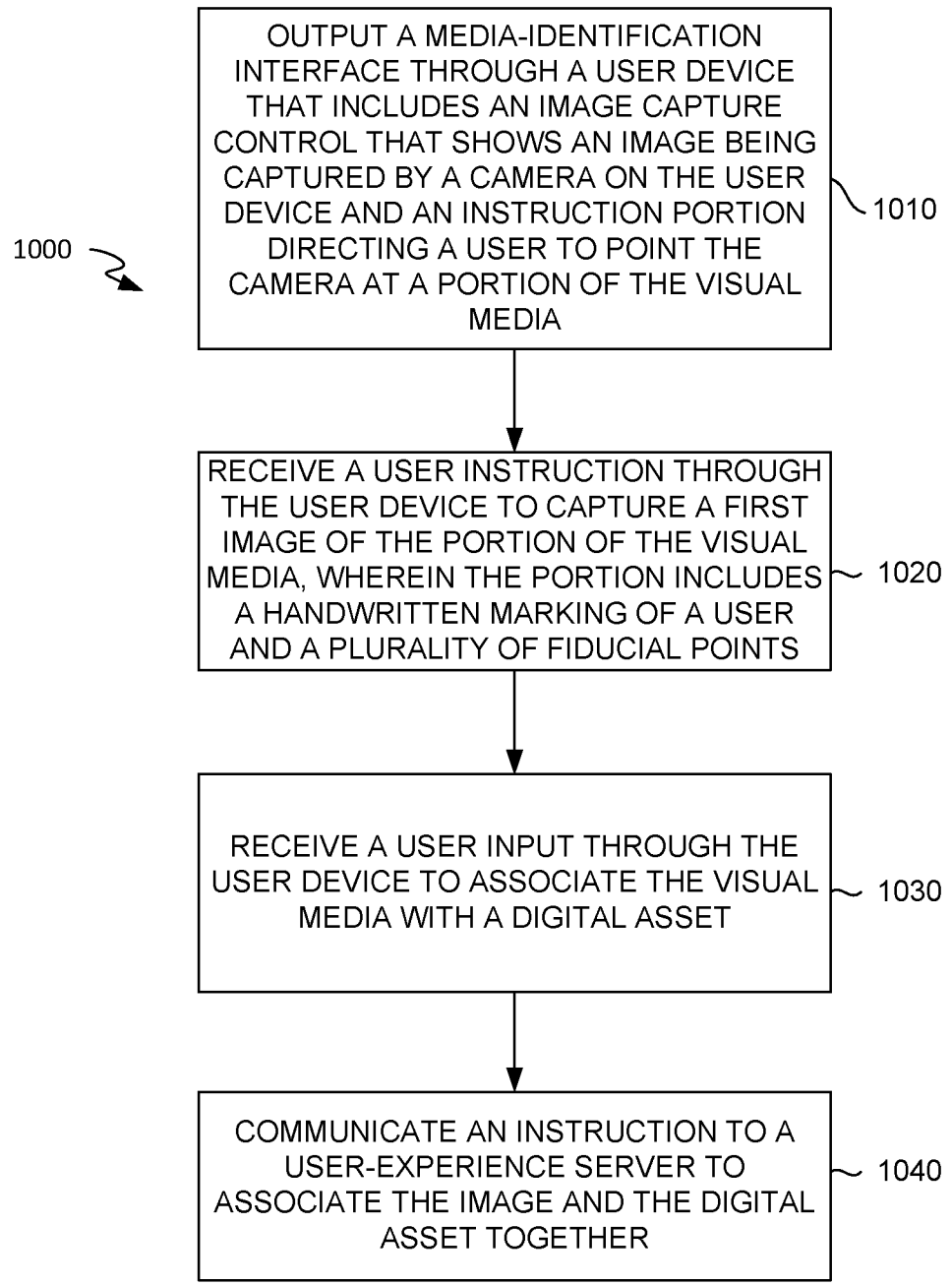
FIG. 10 is a flow diagram that illustrates method for uniquely identifying a visual media, in accordance with aspects of the technology described herein.

Turning now to FIG. 10, a method 1000 for uniquely identifying a visual media is provided.

At step 1010, a media-identification interface is output through a user device that includes an image capture control that shows an image being captured by a camera on the user device and an instruction portion directing a user to point the camera at a portion of the visual media.

At step 1020, a user instruction is received through the user device to capture a first image of the portion of the visual media. The portion includes a handwritten marking of a user and a plurality of fiducial marks.

At step 1030, a user input is received through the user device to associate the visual media with a digital asset.

At step 1040, an instruction is communicated to a user-experience server to associate the image and the digital asset together.

Exemplary Computing Environment

Figure 11:
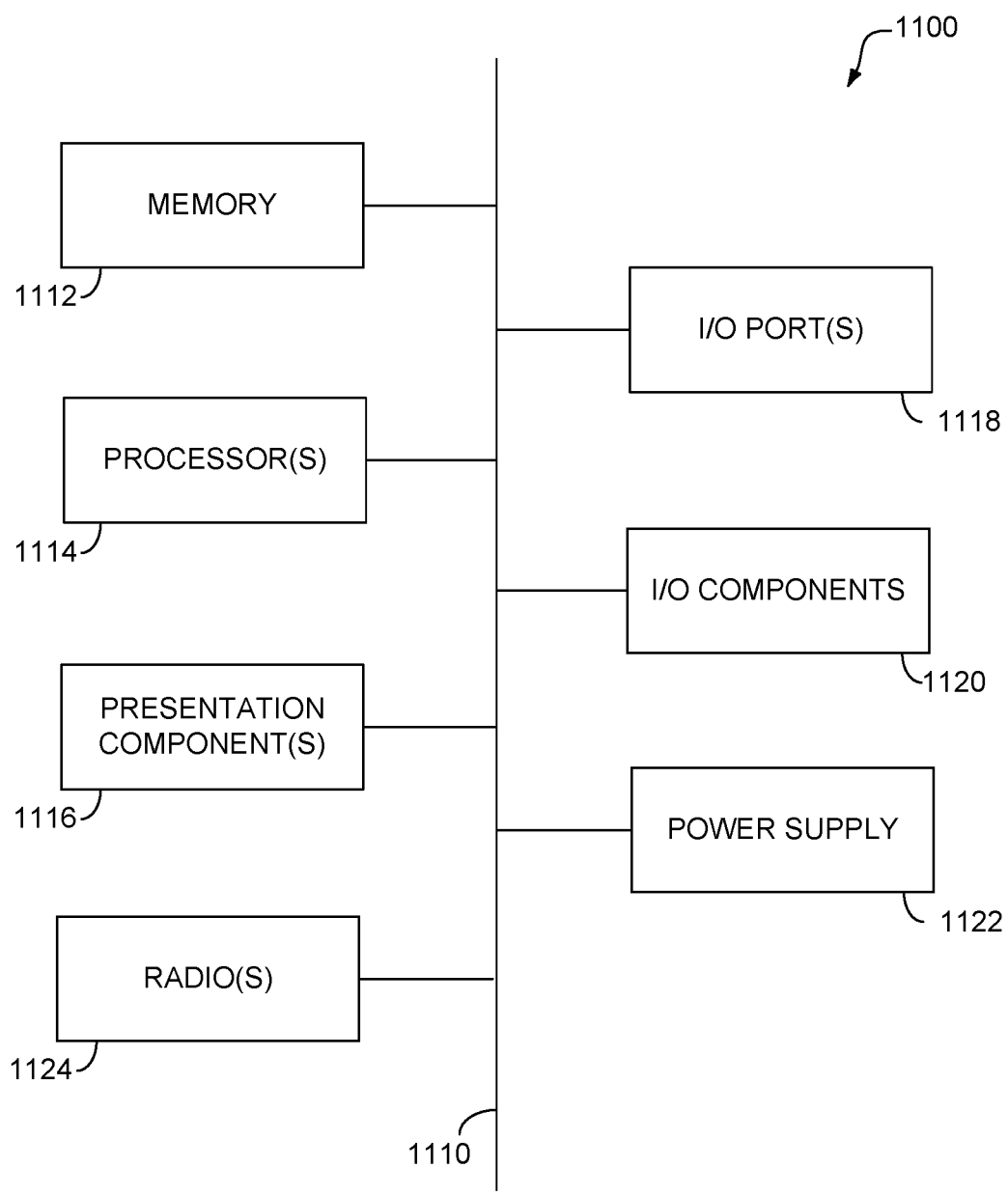
FIG. 11 is a block diagram that illustrates an exemplary computing device.

With reference to FIG. 11, computing device 1100 includes a bus 1110 that directly or indirectly couples the following devices: memory 1112, one or more processors 1114, one or more presentation components 1116, one or more input/output (I/O) ports 1118, one or more I/O components 1120, and an illustrative power supply 1122. Bus 1110 represents what may be one or more busses (such as an address bus, data bus, or combination thereof). Although the various blocks of FIG. 11 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 11 is merely illustrative of an exemplary computing device that can be used in connection with one or more aspects of the present technology. Distinction is not made between such categories as "workstation," "server," "laptop," "handheld device," etc., as all are contemplated within the scope of FIG. 11 and with reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer-storage media and communication media.

Computer-storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1112 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors 1114 that read data from various entities such as memory 1112 or I/O components 1120. Presentation component(s) 1116 presents data indications to a user or other device. Exemplary presentation components include a display device, speaker, printing component, vibrating component, and the like.

The I/O ports 1118 allow computing device 1100 to be logically coupled to other devices, including I/O components 1120, some of which may be built in. Illustrative components include a microphone, joystick, game pad, satellite dish, scanner, printer, wireless device, etc.

The I/O components 1120 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as stereoscopic camera systems, infrared camera systems, RGB camera systems, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

Some aspects of computing device 1100 may include one or more radio(s) 1124 (or similar wireless communication components). The radio 1124 transmits and receives radio or wireless communications. The computing device 1100 may be a wireless terminal adapted to receive communications and media over various wireless networks. Computing device 1100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility, may be employed without reference to other features and sub-combinations, and are contemplated within the scope of the claims.

What is claimed is:

1. One or more computer-storage media having computer-executable instructions embodied thereon that, when executed by at least one processor of a system, cause the system to perform a method, the method comprising:
    obtaining a first image of a portion of a visual medium that includes a handwritten marking and a plurality of fiducial marks;
    associating the visual medium with a digital asset; and
    associating the first image with said digital asset.

2. The media of claim 1, wherein the plurality of fiducial marks serve as landmarks that allow one or more physical attributes of the handwritten marking to be determined in absolute terms.

3. The media of claim 2, wherein said fiducial marks are integrated into a design of the visual medium.

4. The media of claim 1, wherein the visual medium includes one or more of a greeting card, a gift card, or an ornament, and wherein the digital asset includes a digital personal greeting.

5. The media of claim 1, wherein the first image is obtained from a first instance of a first application running on a first device.

6. The media of claim 1, further comprising:
    receiving a second image of the portion of the visual medium that includes the handwritten marking; and
    identifying the digital asset by comparing attributes of the handwritten marking in the second image to attributes of the handwritten marking in the second image.

7. The media of claim 6, wherein the second image is obtained from a second instance of the first application running on a second device.

8. A system, comprising:
    a visual medium that includes a handwritten marking and a plurality of fiducial marks that serve as landmarks that allow one or more physical attributes of the handwritten marking to be determined in absolute terms, including one or more of a location attribute or a size attribute; and
    a computer system adapted to identify a digital asset associated with the visual medium based on the handwritten marking and the plurality of fiducial marks.

9. The system of claim 8, wherein the fiducial marks include straight lines.

10. The system of claim 8, wherein the visual medium includes one or more of a greeting card, a gift card, or an ornament, and wherein the digital asset includes a digital personal greeting.

11. The system of claim 8, wherein said identifying said digital asset comprises:
    receiving a first image of said handwritten marking;
    orienting the first image of said handwritten marking relative to the fiducial marks;
    associating said handwritten marking with said digital asset;
    receiving a second image of said handwritten marking;
    retrieving said digital asset based on said second image of said handwritten marking.

12. The system of claim 11, wherein receiving said first image of said handwritten marking includes receiving a digital representation of said handwritten marking from a first device.

13. The system of claim 11, wherein orienting the first image of said handwritten marking relative to the fiducial marks includes printing the handwritten marking on the visual medium along with the fiducial marks.

14. The system of claim 11, wherein associating said handwritten marking with said digital asset includes one or more of:
    associating said handwritten marking with said digital asset in a data store;
    associating said handwritten marking with said visual medium in a data store; or
    associating said digital asset with said visual medium in a data store.

15. The system of claim 11, wherein receiving a second image of said handwritten marking includes receiving said second image from a device associated with a recipient of said visual medium.

16. The system of claim 11, wherein retrieving said digital asset based on said second image of said handwritten marking includes utilizing characteristics of said second image of said handwritten marking based on its relationship to said fiducial marks.

17. A greeting card, comprising at least one face that includes a plurality of fiducial marks and a handwritten marking in relation to the fiducial marks such that the computer system is able to identify a digital asset associated with the greeting card based on the handwritten marking.

18. The greeting card of claim 17, wherein the fiducial marks serve as landmarks that allows one or more physical attributes of the handwritten marking to be determined in absolute terms.

19. The greeting card of claim 18, wherein the one or more physical attributes include one or more of the following:

a size of the handwritten marking; or
a location of the handwritten marking.

20. The greeting card of claim 18, wherein one or more of the plurality of fiducial marks are integrated into a design of the visual medium.

\* \* \* \* \*